H. M. SMITH AND W. W. STANLEY.
CARTRIDGE CASE.
APPLICATION FILED FEB. 19, 1917.
1,319,185. Patented Oct. 21, 1919.
3 SHEETS—SHEET 2.
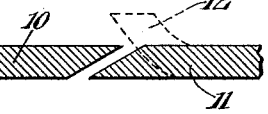
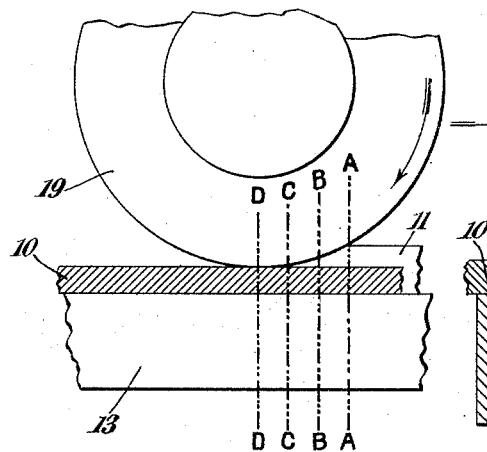
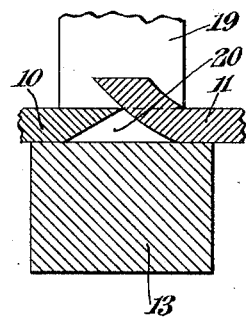
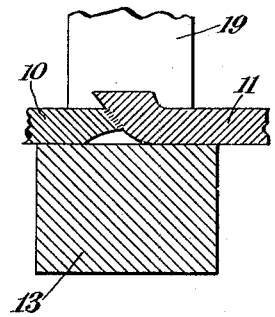
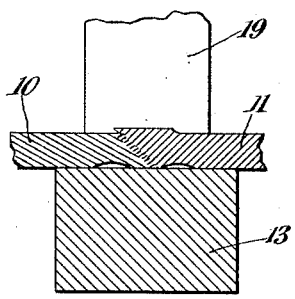
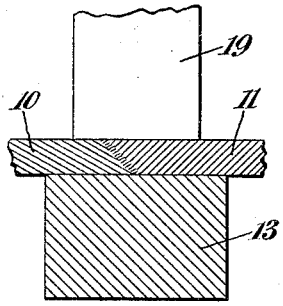
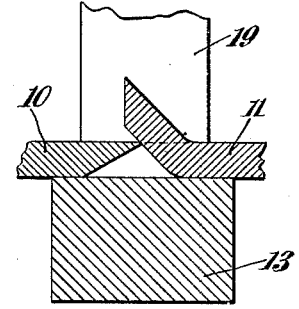
INVENTORS
Herbert M. Smith
William W. Stanley
BY
Kenyon & Kenyon
their ATTORNEYS

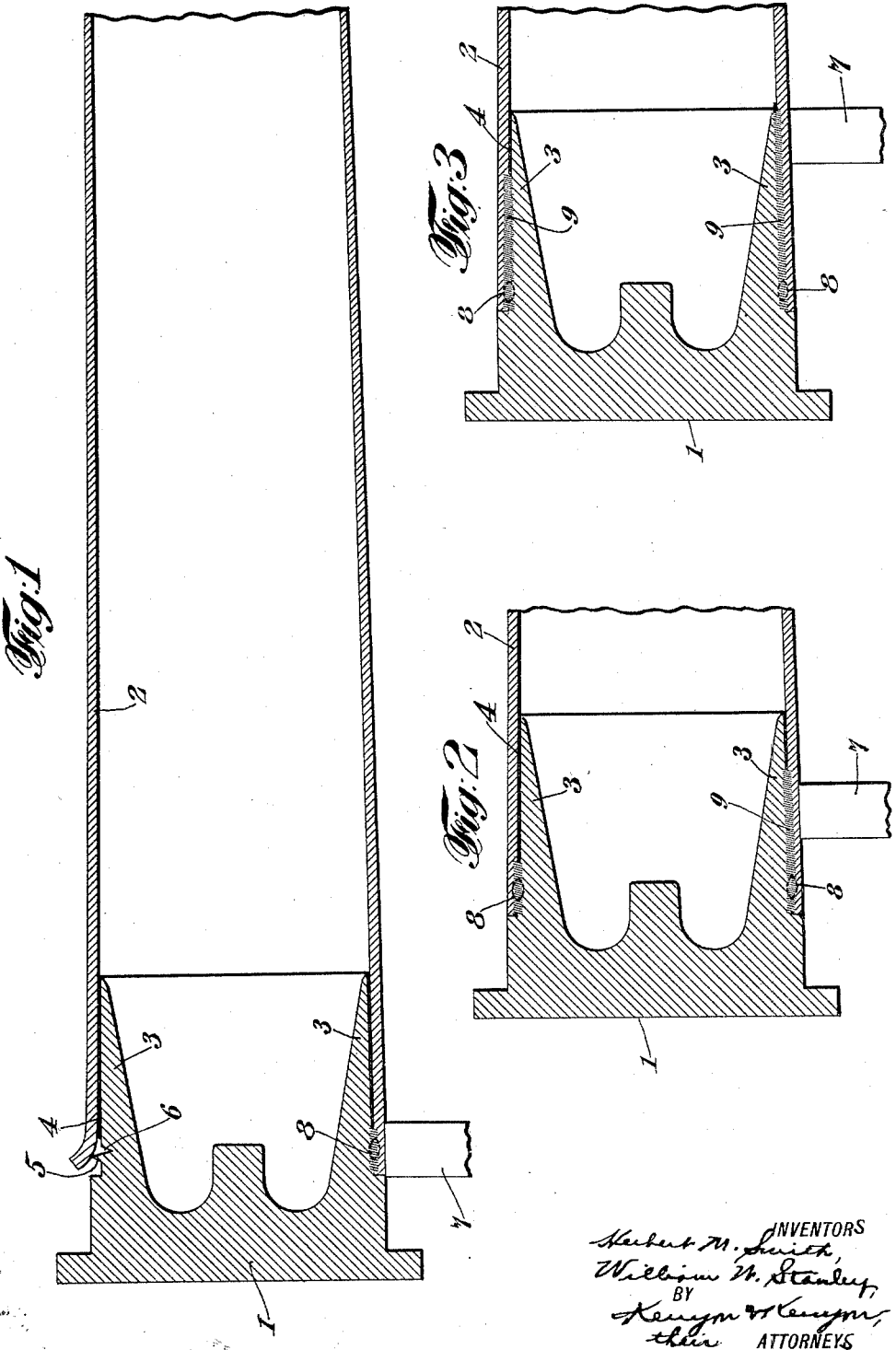

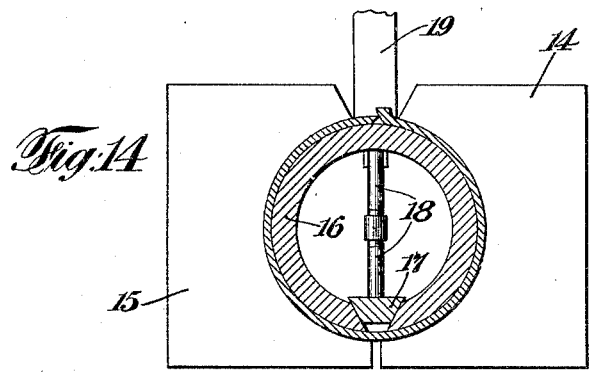
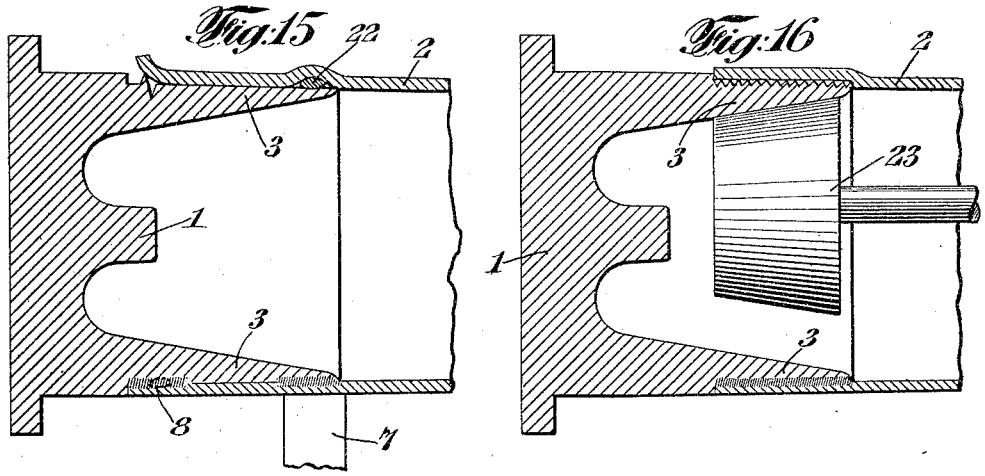
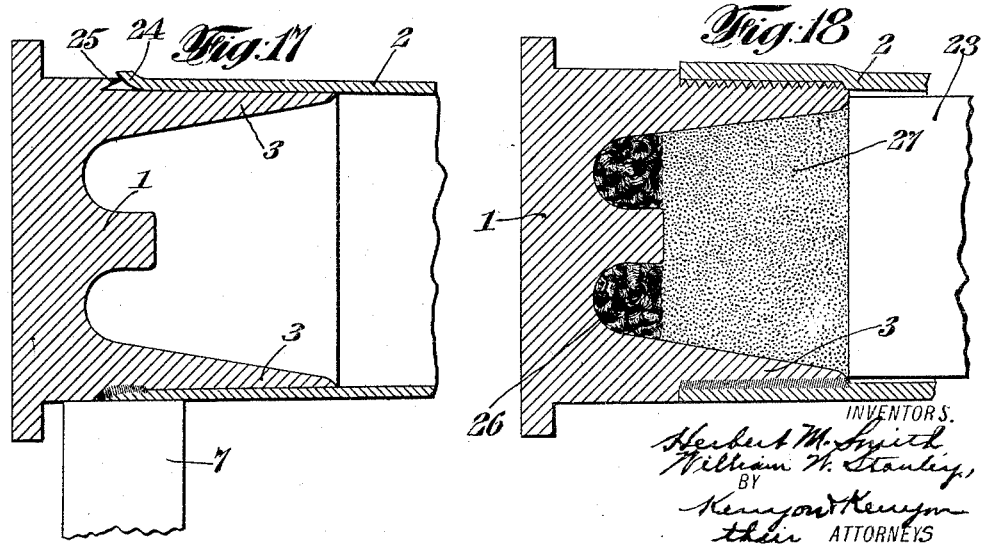

UNITED STATES PATENT OFFICE.

HERBERT M. SMITH AND WILLIAM W. STANLEY, OF GREAT BARRINGTON, MASSACHUSETTS, ASSIGNORS, BY MESNE ASSIGNMENTS, TO STANLEY INSULATING COMPANY, A CORPORATION OF MAINE.

CARTRIDGE-CASE.

1,319,185.     Specification of Letters Patent.     Patented Oct. 21, 1919.

Application filed February 19, 1917. Serial No. 149,649.

*To all whom it may concern:*

Be it known that we, HERBERT M. SMITH and WILLIAM W. STANLEY, both citizens of the United States, and both residents of Great Barrington, county of Berkshire, State of Massachusetts, have invented certain new and useful Improvements in Cartridge-Cases, of which the following is a specification.

The invention relates to improvements in metallic cartridges or cartridge cases. While certain features of the invention may be found of more general use, the improvements are particularly advantageous for cartridges for large fire-arms, such as shrapnel cartridge cases or other cartridge cases of large caliber.

It has, for many years, been common to make cartridges or cartridge cases for small hand fire-arms by attaching to a suitable head a cylindrical casing of sheet metal, but such an arrangement has proved wholly unserviceable and impracticable in the larger fire-arms, because of the far greater pressure exerted therein, causing cartridge cases, made in this manner, to be disrupted, or the leakage of combustion gases therethrough, or both. Consequently, prior to the present invention, practically the sole construction of cartridge cases for large fire-arms, such as shrapnel cartridge cases, has been a cartridge case in which the cylindrical part and head have been formed of a single piece of brass by cupping and drawing.

Cartridge cases constructed in this manner are very expensive, especially those adapted for the larger fire-arms, and it has long been a desideratum to produce a cartridge case for such large fire-arms which would be much cheaper to construct, and which would be equally as efficient in operation. Cartridge cases made in accordance with the present invention have the cylindrical portion made of sheet metal and therefore may be constructed of any desired size without substantial increase in difficulty or expense of production, and may be made much more cheaply than those of the construction commonly used prior to the present invention. In fact, they may be made so cheaply and of such cheap materials that there may be no object in saving them for repeated use. Also, cartridge cases made in accordance with the present invention have the necessary resiliency and may be used repeatedly. They not only fit easily into the gun-chamber, but are so resilient that after having been expanded against the gun-chamber walls by the force of the explosion, they will instantly thereafter contract so that they may be easily withdrawn from the gun.

The parts of the improved cartridge cases are so connected together that there is no leakage of gas therefrom so that they are most efficient in operation. The operations required in making the improved cartridge cases are simple and few, as compared with the many and extensive operations required to make such cartridge cases for the larger fire-arms, as heretofore employed.

The invention will be more clearly understood from the detailed description given below, taken in connection with the accompanying drawings which form a part of this specification. Referring to the drawings, Figure 1 is a longitudinal section through part of a cartridge or shell case, illustrating an embodiment of the invention in a preferred form before the construction of the cartridge case has been completed;

Fig. 2 is a similar section illustrating the same at a later stage of the construction;

Fig. 3 is a similar view illustrating the same at a still later stage of the construction;

Fig. 4 is a detail illustrating the preferred method of constructing the edges of the sheet metal forming the cylindrical part of the casing prior to the securing of its edges together to form a complete cylinder;

Fig. 5 shows a portion of the mandrel and welding wheel electrode, electrically welding the edges of the cylindrical member together;

Fig. 6 illustrates the position of these edges at the beginning of the welding process, taken on the line A—A of Fig. 5.

Fig. 7 is a similar view, illustrating the same at a later stage, taken on the line B—B of Fig. 5.

Fig. 8 is a similar view, illustrating the same at a still later stage, taken on the line C—C of Fig. 5;

Fig. 9 is a similar view, illustrating the same at the completion of the welding of the edges of the cylindrical member, taken on the line D—D of Fig. 5;

Fig. 10 is a view similar to Fig. 6, illustrating another method of constructing the edges of the cylindrical member for electrically welding them together;

Figs 11, 12 and 13 are similar views illustrating other methods of constructing the edges of the cylindrical member for welding them together;

Fig. 14 is a section through the cylindrical member as the welding of the edges thereof together is being accomplished, showing the method of holding the parts during welding;

Figs. 15, 16, 17 and 18 are figures similar to Fig. 1, illustrating other methods of securing the cylindrical member to the head.

Referring to Fig. 1, 1 represents the circular head or butt of the cartridge case to which the cylindrical casing 2 is attached. The cylindrical casing 2 is tapered as shown in Fig. 1, or it may be bottle-necked, if desired, and is made of sheet metal, the thickness of the metal also tapering as shown in Fig. 1, so that it is thicker at the butt 1 than it is at the opposite end. Sheet steel is preferably used for the making of the cylinder 2, although other sheet metals or alloys may be found useful for this purpose. The sheet metal, however, should have the required resiliency, so that it will properly expand against the inside of the gun chamber, so that the gun chamber will take the force of the explosion, and then the cylinder will contract so that it may be easily removed from the gun-chamber. One advantage of tapering the metal of the cylinder at the end opposite the butt is to make that end more ductile than the butt end so that it will expand with the explosion of the charge and prevent any leakage of gas between the walls of the gun chamber and the mouth of the casing. This ductility at the mouth of the cartridge case may be accomplished in other ways, as by annealing.

Assuming that the cylinder 2 has been properly formed, it is placed over the cylindrical flange 3 of the butt 1, as illustrated in the upper part of Fig. 1. Inserted between the flange 3 and the cylinder 2 is a thin sheet of aluminum bronze, or other suitable metal 4. Also the flange 3 is provided with a sharp circumferential ridge 5 and adjacent circumferential depression 6 for the purposes hereinafter to be described.

In order to secure the cylinder 2 to the flange of the butt 1 with sufficient strength and to produce a gas-tight joint therebetween, the two are electrically welded together. For this purpose a welding electrode wheel, illustrated at 7, is passed about the cylinder 2 opposite the ridge 5 and the current passing through the cylinder 2 and narrow point of ridge 5, causes the point of ridge 5 to be easily melted to produce a thorough welding of the two together. The metal flows into the groove 6 so that after the welding wheel 7 has passed circumferentially around the cylinder and butt, the two parts are welded together as illustrated in the bottom half of Fig. 1, at 8, and integrally connected. After this has been accomplished, the welding electrode wheel is similarly passed about the parts at a point nearer the edge of the flange 3, as illustrated in Fig. 2, and the joint between the cylinder 2 and flange 3 is widened or extended by the melting of the aluminum bronze which brazes the two parts together, forming an alloy with the casing and also an alloy with the flange 3, so that they are connected, as illustrated at 9. Then the welding electrode 7 is preferably passed about the cylinder 2 opposite the edge of the flange 3, as illustrated in Fig. 3, causing the parts to be brazed together at the edge of the flange so that the edges of the flange 3 are firmly connected with the cylindrical casing 2. In some aspects of the invention the welding of the flange and casing need not be carried to the inner edge of the flange, but in such case the space between the casing and flange should be filled with a resilient or ductile metal, so that a gas-tight connection will be made between the casing and the edge of the flange. This is important, because, otherwise, if the inner edge of the cylindrical flange 3 were not connected to the casing 2, the great pressure within the cartridge would act equally on both sides of the flange 3 and very likely cause the cylinder 2 to be torn away from the flange. By joining the cylindrical casing 2 to the flange 3 at the inner edge of the flange, and also by having the flange 3 tapering off on the inside, as shown in Figs. 1, 2 and 3, the flange 3 is made sufficiently flexible so that it will expand outwardly with the casing 2 and there will be no serious tendency for the casing 2 to be torn from the flange 3, or any leaks produced therebetween.

In order to first form the cylinders 2, sheets of metal of the required dimensions are produced and then the two lateral edges of the sheets are preferably secured together in the manner illustrated in Figs. 4 to 14.

Referring to Fig. 4, the two edges 10 and 11 of the sheets are beveled off, the bevel of one being parallel to the bevel of the other, as illustrated in Fig. 4. Then the edge portion of one is bent laterally so as to be laterally displaced with respect to the other, as indicated in dotted lines at 12, the bevel face thereof being brought into a position parallel with the main body of the sheet. These edge portions are then brought into juxtaposition to one another, as illustrated in Fig. 6, and suitably clamped relatively to one another and to a fixed electrode 13, so that they cannot move bodily relatively to one another. One method of clamping the parts is illustrated in Fig. 14, in which two hollowed out jaws 14 and 15 are provided with their inner faces of proper dimensions to fit and grip the cylindrically formed sheet of steel, or other sheet metal, the edges of which are to be welded. Inside is an expanding mandrel 16 of which the electrode 13 may be said to be a part. The mandrel 16 is expanded by a wedge 17 operated by toggle links, or screw-bars 18, so that the article is tightly gripped at practically all points, except directly beneath the electrode wheel 19. The electrode wheel 19 is then passed over the parts to be joined, as illustrated in Figs. 5 to 9, inclusive. The peripheral face of the wheel or roller is parallel to the beveled face of the part 12, so that there is a relatively large surface engagement therewith to provide a path of relatively small resistance to the current from the roller to the edge of the sheet 11. The current passes through the edge of the sheet 11 and through the sheet 11 to the electrode 13. Another portion of the current passes through the relatively long narrow edge or line in contact between the sheets 10 and 11 and through the sheet 10 to the electrode 13. The parts through which the current passes become heated to the welding point at the surfaces of contact, are softened and by means of the pressure applied by the wheel 19 are forced downwardly while still heated, welding the metal parts together at their surface of contact and forcing them into the space 20 above the stationary conductor 13.

Owing to the relatively small area of contact of the different parts at the point A—A, as shown in Fig. 6, the parts become rapidly heated, but probably the highest temperature is reached in the neighborhood of the points B—B or C—C, as shown in Figs. 7 and 8. After this, owing to the increasing width and area of the weld, and consequently the affording of a path of less resistance, so that the current is more distributed, the parts become cooled below the welding point, but the roller 19 continues to forge the parts, in the position shown in Fig. 9, to solidly confine them between the wheel 19 and the stationary conductor 13, the parts being at a lower temperature and offering greater resistance to forging as the pressure is at a maximum during this portion of the operation, so that the forging is completed at a temperature below the welding point, which is desirable in that it results in a weld that is at once uniform and practically free from blow-holes or other imperfections.

While it is practically impossible to ascertain the exact temperatures of all the parts at the various stages illustrated in Figs. 6 to 9, yet from the color of the metal observed in the welding of such thin metal sheet edges, it is believed that the temperature of parts on the line A—A is about 1200° C., of the parts on the line B—B and on the lines C—C about 1500° C., and of the parts on the line D—D about 1000° C., or less. It will be seen that the welding first takes place along the narrow edge and is gradually carried on over the surface to be welded until the whole end edge is welded at the last stages. By first welding this thin part or corner of the sheet 10, then forging the other part down upon it, while the latter is above the welding temperature, it will, during the forging operation, fill up the space left by any irregularities and form a clean, perfect weld to the member 10. This will happen more readily because the edge of the sheet 10, being thin, is easily softened and offers little resistance to the downward forging action, even where it is already welded to the sheet 11, there being little, or no, bridging effect to prevent adjacent portions of the sheet edges 10 and 11 from coming into contact with each other, so that the edge of sheet 10 is bent downwardly during the forging operation so as to continue to bring new portions of the sheet 10 into contact with the sheet 11, this also being simultaneously bent and forced downwardly until the forging operation is completed. Even if foreign particles occur on the surface to be united so great an area of contact is established around the foreign particles that a tight joint will still be produced.

It is evident that by varying the proportions of the space 20 and of the amount of overlap or volume of metal at 12, laterally displaced, welds of any desired thickness may be obtained. Preferably, the volume of the space 20 substantially equals the volume of metal laterally displaced at 12, so that the resulting joint will be substantially equal in thickness with that of the adjacent portions of the sheet metal. It is found that sheet edges welded and forged in this manner are practically free from defects.

While it is very desirable that the surface of the edge of the sheet 11 be parallel to the peripheral surface of the electrode roller 19, in order that there shall be no sharp corners, which might produce depressions in the roller 19, this is not essential so far as the resulting weld is concerned. A satisfactory weld may be obtained even when the edge of the sheet presented to the roller is not parallel therewith. For instance, as illustrated in Fig. 10, the edge of the sheet 11 is beveled in the opposite direction from that shown in Fig. 4, so that an edge or corner is presented to the wheel 19, but in this case the contact surface of the wheel is more quickly roughened to a point where resurfacing thereof is advisable in order to obtain the best results. The resulting weld, however, is substantially the same as that shown in Fig. 9. Also, as shown in Fig. 11, both of the edge portions of the sheets 10 and 11 may be bent upwardly so as to contact along a line at 21 and the forging roller passes thereover which forces the thinner portions together downwardly so that the contact area between them gradually increases and they are gradually forged into the space below so as to produce a uniform weld of practically the same thickness as the adjacent sheet portions.

The arrangment illustrated in Fig. 12 is similar to that illustrated in Figs. 4 to 9, except that instead of making the edge portions thinner by means of flat bevels, it edges the bevel off more or less round, which resulting weld is practically the same. In Fig. 13 only one of the sheet edges is shown beveled or cut away so as to be thinner on the edge portion. From this figure it will be seen, however, that the engagement of parts is initially along the single line or narrow edge of contact between the two and that the area of engagement will be gradually increased as the forging and welding continues; also upon the forging being completed, the resulting joint will be substantially of the same thickness as the adjacent sheet portions.

Referring to Fig. 15, there is there shown a modified method of securing the cylindrical portion 2 to the head 1. The weld at 8 is produced in the same manner as described in connection with Fig. 1, but the secure attachment of the edges of the flange 3 to the cylinder 2 is produced by providing a strip of silver solder 22 around the flange 3 and between it and the cylinder 2, as illustrated at 22. The electrode welding wheel 7 on being passed about the parts at this point causes the silver solder 22 to firmly unite the edges of the flange 3 to the cylinder 2 to form a gas-tight joint between them.

In the modification shown in Fig. 16, the outer face of the cylindrical flange 3 is corrugated as by screw-threads, and a welding electrode wheel 23 is passed about the flange on the inside thereof, current passing through the ridges on the outside of the flange and continuing through the cylinder 2 to another suitable electrode so that the ridges on the outside of the flange 3 are melted and the same forced toward and welded to the cylinder 2.

In Fig. 17 another method of welding the flange 2 to the head 1 is illustrated. In this case, the edge of the cylinder 2 is bent upwardly as at 24 and the butt or head 1 is undercut as at 25 so that the welding operation takes place in practically the same manner as illustrated in Figs. 6 to 9, inclusive.

As illustrated in Fig. 18, a packing 26 is placed in the inner part of the head 1 within the cylindrical flange 3 and then it is packed with copper grains 27 and an electrode 28 applied thereto, current passing from the electrode 28 to the copper grains, thence through the flange 3 and the corrugations on the outside thereof, thence through the cylindrical member 2 to a suitable member on the outside. The current causes the corrugations on the flange 3 to be heated and melted so that they become welded to the cylinder 2, as illustrated in the bottom half thereof.

It will be seen that a cartridge case constructed in the way above illustrated may be made out of very much cheaper materials than have been found necessary to use in the past for making shells for large firearms; that the cases may be made very cheaply and efficiently because they are formed out of sheet steel which is easily and quickly secured to a steel or iron head. The longitudinal joint by which the edges of the sheet of steel forming the cylinder 2 are connected together as illustrated in Figs. 4 to 9, or in Figs. 10 to 13, is preferably made straight so that there is no danger of there being parts thereof containing imperfections or leaks, and the same has a strength substantially equal to, or greater than that of the sheet metal itself. It is immaterial for the purposes of this invention whether the longitudinal joint be strictly parallel with the axis of the completed cylinder or otherwise, as, for example, spiral with respect thereto, although we prefer the arrangement illustrated in the drawings. It will be understood that by a substantially straight line joint we mean a joint that is formed by securing together the edges of a sheet of metal, which edges have been cut either actually straight or curved on a relatively large radius, as contrasted with a joint that follows a line having many sharp curves or angles, consequently presenting a multiplicity of small curves or corners which make a gas-tight joint practically impossible to obtain. As a matter of fact, it is found that if a tensile test is applied to a cartridge case embodying our invention, the steel will rupture not in the joint, but rather in the metal outside of the joint, and the same is true of the integral connection formed by the weld between the cylinder 2 and the head 1.

By including the strip of aluminium bronze 4 between the cylinder 2 and head 1, as shown in Fig. 1, and then passing the electrode wheel thereover, all three parts are firmly secured together by melting these parts and forming an alloy therewith so that the parts are all securely connected. The metal, or aluminum bronze, fills up all spaces between the parts and it to some extent, may flow out between the flange 3 and cylinder 2 at the inner end of the flange. Thus, a gas-tight joint is made doubly certain. The securing of the edges and the tapering off of the flange 3 downwardly permits of the necessary resiliency of the flange so that it will expand with the cylinder 2 so that the shock of the explosion may be taken by the gun-chamber and the cylinder 2 will not be torn away from the flange 3, and likewise, the parts, after the explosion, will contract so that the cartridge may be easily withdrawn from the gun-chamber. By providing the sheet metal thicker at the end adjacent the head 1, the same is made of greater strength where great strength is needed, and much greater resiliency offered where great resiliency is desired.

While we have disclosed the making of the joints by electric welding, nevertheless other methods of welding, or other methods of forming the joints may be used, provided the resulting cartridge cast possesses the essential characteristics decribed and claimed herein. The joint produced by electric welding is relatively dense compared with the joint produced by certain other methods.

It will, of course, be apparent that the use of aluminum bronze between the cylinder 2 and the flange 3 is not essential to our invention in its broader aspects as the parts may be welded or integrally secured together in any desirable manner that insures a resilient gas-tight joint. Similarly it is not essential that the metal of the casing be tapered toward the forward end or that the casing itself be made of sheet metal welded as we have described or along exactly straight lines. For example, in some aspects of the invention, the casing might be of uniform cross-section throughout its length or it might be made of any well-known seamless tubing of sufficient resiliency and desirable in other respects. The foregoing description is merely addressed to the preferred means for constructing our improved cartridge case, and, in short, although the improvements have been described in great detail, nevertheless it is not intended that the invention be limited to such details, since many other modifications and changes may well be made without departing from the spirit and scope of our invention in its broader aspects and it is intended to cover all constructions coming within the scope or language of the appended claims.

Having thus described our invention, what we claim as new, and desire to secure by Letters Patent, is:

1. The improved cartridge case for use in guns of large caliber comprising a casing of sheet steel having a substantially straight longitudinal joint of substantially the same thickness as the sheet steel, the tensile strength of the joint being substantially as great as that of the sheet metal and the parts on each side of the joint being joined together so as to be integral with one another and form a gas-tight joint, and a head of steel integrally secured to the casing to form a gas-tight joint between the casing and the head.

2. The improved cartridge case for use in guns of large caliber comprising a casing of sheet steel having a substantially straight longitudinal joint of substantially the same thickness as the sheet steel, the tensile strength of the joint being substantially as great as that of the sheet metal and the parts on each side of the joint being joined together so as to be integral with one another and form a gas-tight joint, and a head of steel provided with a cylindrical flange tapering off on the inside and inserted in the casing and integrally secured to the casing to form a gas-tight joint between the casing and the head.

3. The improved cartridge case for use in guns of large caliber comprising a casing of sheet steel having a longitudinal joint, the tensile strength of the joint being substantially as great as that of the sheet metal, and a head of steel provided with a cylindrical flange tapering off on the inside and inserted in the casing and integrally secured to the casing to form a gas-tight joint between the casing and head.

4. The improved cartridge case for use in guns of large caliber having a head of steel with a cylindrical flange, a cylindrical casing fitting over said flange and integrally secured thereto along a line extending circumferentially about the flange, and said casing also being secured to said flange along a band extending circumferentially around the flange at the edge of the flange.

5. The improved cartridge case for use in guns of large caliber having a head of steel with a cylindrical flange tapering off on the inside thereof, a cylindrical casing extending around the outside of said flange and integrally secured thereto near the end of the casing, and said casing being also integrally connected to the flange at the edge of the flange, substantially for the purposes described.

6. The improved cartridge case for use in guns of large caliber comprising a cylindrical casing, a head of steel having a cylindrical tapered flange, an integral joint between the casing and the flange, and a gas-tight connection between the casing and the flange along the tapered edge of the flange.

7. The improved cartridge case for use in guns of large caliber comprising a casing of sheet steel having a substantially straight line joint, the parts on each side of the joint being joined together so as to be integral with one another and form a gas-tight joint, and a head of steel having an annular tapered flange integrally secured to the casing by ductile metal to form a gas-tight joint.

8. The improved cartridge case for use in guns of large caliber comprising a casing of sheet steel having a longitudinal gas-tight joint, and a head of steel integrally secured to the casing and an alloy continuous with the metal of the head and of the casing.

9. The improved cartridge case for use in guns of large caliber comprising a casing of sheet steel having a joint of tensile strength substantially equal to that of the sheet steel, a head of steel and ductile metal fused between the casing and head.

10. The improved cartridge case for use in guns of large caliber comprising a cylindrical casing of steel, a head of steel having a cylindrical tapered flange, an integral joint between the casing and the flange, and a ductile metal entering into the formation of a gas-tight joint between the casing and flange along the edge of the flange.

11. The improved cartridge case for use in guns of large caliber comprising a casing of steel having a substantially straight line joint of substantially the same tensile strength as the metal of the sheet, a head of steel integrally secured to the butt end of the casing, the said casing being more ductile adjacent the mouth thereof than adjacent the butt end.

12. The improved method of producing a cartridge case for use in guns of large caliber which consists in welding a cylindrical casing of steel to a cylindrical flange on a head of steel to form a gas-tight joint between the casing and flange.

13. The improved method of producing a cartridge case for use in guns of large caliber which consists in welding together the edges of a sheet of steel to form a cylindrical casing having a substantially straight line joint, and then securing the cylindrical casing to a cartridge head of steel by means of a gas-tight joint.

In testimony wheerof we have signed our names to this specification.

HERBERT M. SMITH.
WILLIAM W. STANLEY.

Copies of this patent may be obtained for five cents each, by addressing the "Commissioner of Patents, Washington, D. C."